Figure 1:
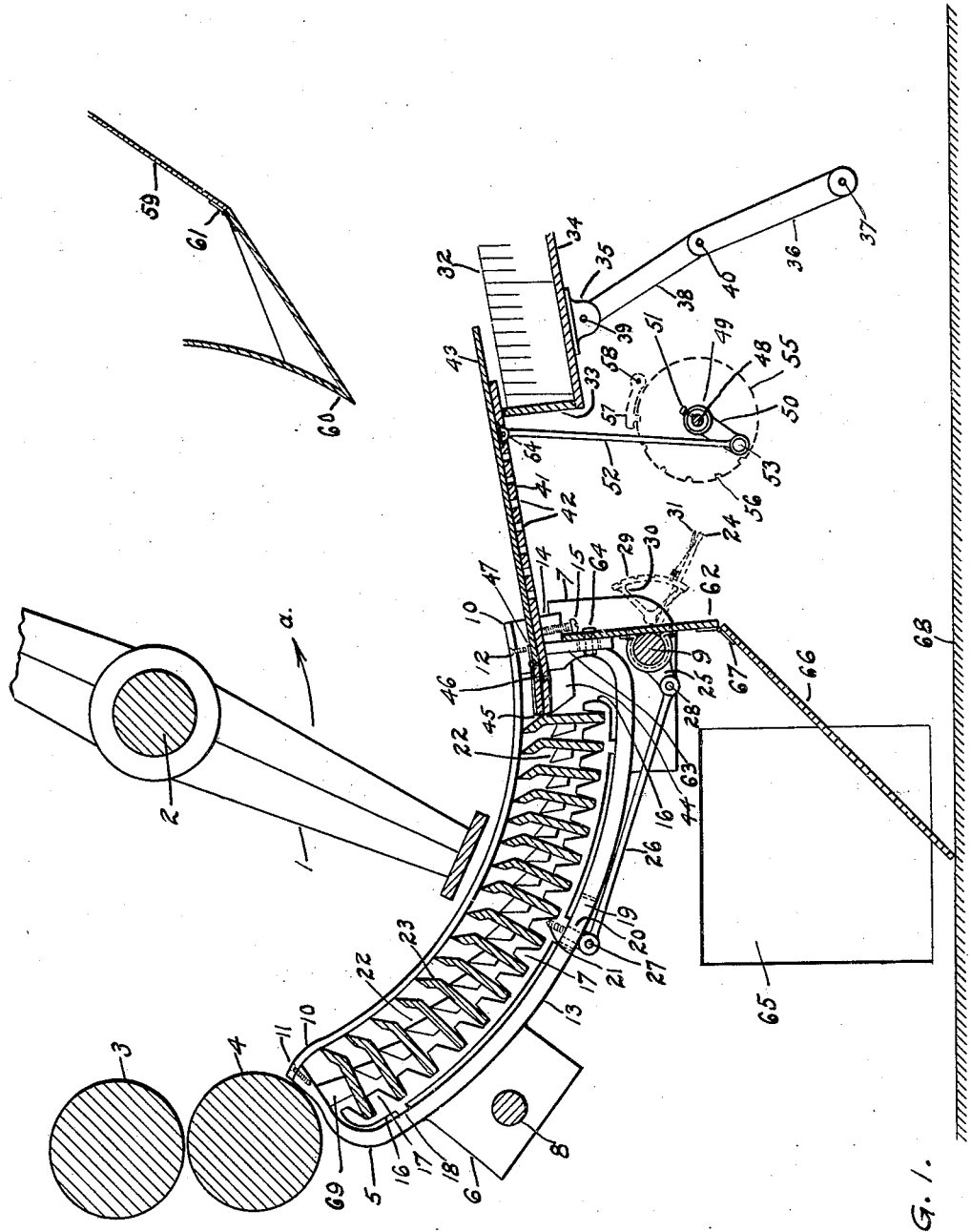

No. 897,320. PATENTED SEPT. 1, 1908.
A. ST. ONGE.
COTTON PICKER MACHINE.
APPLICATION FILED JUNE 25, 1907.

2 SHEETS—SHEET 1.

WITNESSES,
Howard A. Lamprey
Annie E. Perce

INVENTOR,
Amasa St. Onge
By Warren R. Perce
ATT'Y.

No. 897,320.

PATENTED SEPT. 1, 1908.

A. ST. ONGE.
COTTON PICKER MACHINE.
APPLICATION FILED JUNE 25, 1907.

2 SHEETS—SHEET 2.

WITNESSES,
Howard A. Lamprey
Annie E. Pierce

INVENTOR,
Amasa St. Onge
BY Warren R. Pierce
ATT'Y.

UNITED STATES PATENT OFFICE.

AMASA ST. ONGE, OF PROVIDENCE, RHODE ISLAND, ASSIGNOR TO CLEMENTS A. BROWN AND SAID AMASA ST. ONGE, OF PROVIDENCE, RHODE ISLAND, COPARTNERS AS THE BROWN-ST. ONGE COMPANY.

COTTON-PICKER MACHINE.

No. 897,320.        Specification of Letters Patent.        Patented Sept. 1, 1908.

Application filed June 25, 1907. Serial No. 380,767.

*To all whom it may concern:*

Be it known that I, AMASA ST. ONGE, a citizen of the United States, residing at Providence, in the county of Providence and State of Rhode Island, have invented certain new and useful Improvements in Cotton-Picker Machines, of which the following is a specification, reference being had therein to the accompanying drawings.

Like reference numerals indicate like parts.

Figure 2:
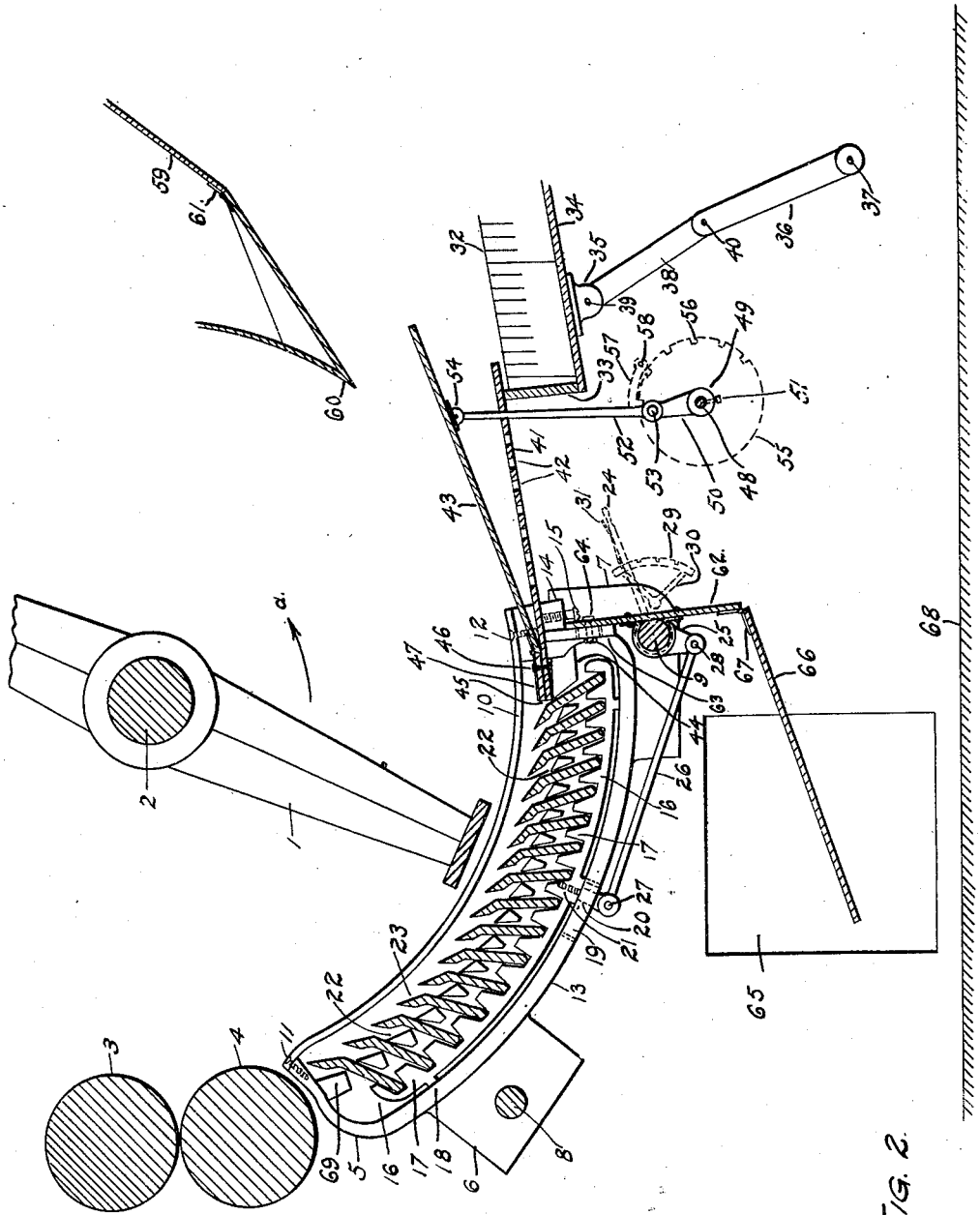

Figure 1 is a view of my improved cotton picker machine, as seen partly in central longitudinal section and partly in elevation, the damper being closed and the grid bars in their open position. Fig. 2 is a similar view, showing the damper open and the grid bars in their close position.

My invention relates to cotton picker machines, and consists of the novel construction, combination and arrangement of parts as hereinafter described and claimed.

The cotton picking machines, to which my invention refers, are used to dislodge, beat out and remove from the cotton, taken from the bale, the seeds, grit, dirt, and other foreign matter, which it contains; and my invention has for its object the provision of movable (but not pivoted) separate grid bars, in series, with means for adjusting them simultaneously to vary, to a desired degree, the apertures or clearance between them, for the proper removal and discharge of the matter and substances, which have been thus separated from the cotton fibers.

Another object of my invention is to provide means for regulating, to a desired degree, the air currents, caused by the fan, so that the proportionate part of the air passing between the grid bars may be varied at will, without any change in velocity of the fan, or any adjustment of the driving mechanism of the fan.

So far as the mounting, operation and adjustment of the bars of my improved grid are concerned, this invention is an improvement upon the grid bars shown in Letters Patent, issued to Clements A. Brown and myself, September 17, 1907, No. 866,234.

Referring to the drawings, 1 represents a beater, mounted on and revolving with a shaft 2. The feed rolls 3 and 4 deliver the cotton to the beater 1, as usual.

There are two side pieces or castings, designated as 5, and arranged parallel to each other on the two opposite longitudinal sides of the frame of the machine by means of the downwardly extending brackets 6 and 7, preferably integral with each, respectively, through which brackets the rod 8 and the shaft 9 pass, as shown.

The side plates 5 are curved and mounted concentrically with the shaft 2. Each side plate 5 has an upper, inwardly-projecting flange 10, which is detachable therefrom, and is held in position upon the upper edge of said side plate 5 by screws 11 and 12. Each side plate 5 also has an inwardly-extending, bottom flange 13, preferably integral therewith, which is prolonged and extended to cover the two ends of said side plate, and is enlarged at 14, where it is tapped for the reception of a screw 15.

On each side a curved notched plate 16 is provided with teeth 17 on its upper edge and with feet 18 on its lower edge. There is one of these notched plates 16 for each side piece 5. The notched plate 16, by its feet 18, rests upon the upper surface of the bottom flange 13, and is slidable thereon. As seen in the drawings, these teeth 17 are graduated in width from one end of the notched plate 16 to the other. The flange 13 is slotted longitudinally, about midway its length, as indicated by dotted lines at 19. A block 20 is longitudinally tapped to receive a screw 21, and extends through the slot 19, and the screw 21 extends up into the adjacent tooth 17 of the notched plate 16, as shown.

Fixed or stationary lugs 22 project from the exposed face of each side piece 5 toward the central longitudinal line of the machine, and are arranged in a curved row, parallel to the upper and lower flanges 10 and 13. They are preferably cast on said face of the side piece 5. They are graduated in width, as shown.

The bars 23, which together constitute the grid, are separate from each other. Each one is made of sufficient length to extend across the machine from side to side, and they are supported at the ends, respectively, on the oppositely-arranged side pieces 5. Each bar 23 has a straight body portion, of uniform thickness, except that the bottom edge is slightly rounded. The upper end of each bar 23 is bent at an angle of approximately 140 degrees, and is beveled to form a striking edge of approximately 30 degrees.

Each fixed lug 22 is four-sided, as seen in cross section, and the sides thereof are disposed in approximately the following named angles: The upper side to the right-hand side (as seen in the drawings) 100 degrees, and to the left-hand side 40 degrees; and the lower side to the right-hand side 90 degrees, and to the left-hand side 130 degrees. These angles have been ascertained and determined by long-continued experiments to be the most advantageous and effective for the purposes of this device as hereinafter explained. It is shown in the drawing that the lug 22 nearest the roll 4 is the widest, and the lug 22 farthest from the roll 4 is the narrowest, but it is seen that the distance between the upper right-hand corner of all the lugs 22, respectively, and the upper left-hand corners of all the lugs 22 next adjacent to the right, respectively, is the same. The said lugs 22 regularly diminish in width from left to right, as seen in the drawings. In like manner, although the teeth 17 of each notched plate 16 are of graduated widths, diminishing regularly from left to right, yet their angles at the corners thereof and the width of the sockets or recesses at the bases of said teeth are alike. The angles found by said experiments to be the most advantageous and efficient are as follows: the upper side to the left-hand side, as seen in the drawings, 90 degrees, and to the right-hand side 120 degrees. The distance between the bases of each two contiguous teeth 17 of the notched plate is approximately equal to the thickness of the bars 23.

The bars 23 are separately detachable, when the upper flange 10 of each side piece 5 is removed. The bars 23 can then be separately inserted in position between the fixed lugs 22 and seated in the recesses between the teeth 17 of the notched plate 16, or can be withdrawn and removed from said position, but the spacing of the upper corners of the lug 22 apart, as already specified, is just sufficient to allow any bar 23 to be inserted with a sliding fit between said corners, and to be in constant abutment therewith, on both the forward edge and the rear edge of said bar 23, whatever may be the position of the notched plate 16.

The shaft 9 has a lever arm 24, extending therefrom and serving as a handle, on the outside of the machine, and it is consequently shown in dotted lines. A ring is fastened on the shaft 9 and supports a bracket 25. A link bar 26 is pivotally connected at 27 to the block 20, and is also pivotally connected at 28 to the bracket 25. A similar device is provided, adjacent to the opposite side piece 5. By moving the lever or arm 24, the shaft 9 is rocked in its bearings, and the parts connected moved to the position shown in Fig. 1, or to that shown in Fig. 2, or to any intermediate position, as may be desired. An arc-shaped notched plate 29 has radial arms 30, by which it is mounted and fastened on the outer side of the machine. A spring latch 31, on the outer end of the lever or arm 24, is adapted to engage either one of the notches on the plate 29 to hold the notched plates or racks 16 in their adjusted positions on the side pieces 5. A second or longitudinal grid 32 is supported, as usual, by the frame of the machine and has a fixed end 33. It has also the pivotally mounted bottom 34, as heretofore, for dumping. A bracket 35 is screwed to the bottom 34. An arm 36 is pivotally mounted at 37, and arm 38 is pivotally mounted on the bracket 35 at 39, and the two arms 36 and 38 are pivotally connected at 40. A sheet or plate 41 of metal, having a series of perforations 42, is supported at its outer end on the fixed ends 33 of the second grid 32 and at its inner end on the enlargements 14 of the flanges 13 of the side pieces 5.

A damper 43 is adapted to rest on the perforated metal plate 41, as seen in Fig. 1. The plate 41 is inserted in and supported by a groove in the enlarged end 14 of the flange 13 of the side piece 5, on each side, and rests also at one end on a fixed lug 44, projecting from each side piece 5, and is slightly bent at that end, as shown. A metallic strip 45 extends across the machine and rests upon said bent end of the perforated plate 41, and is screwed thereto by screws 46. Hinges 47 at intervals connect the damper 43 to the strip 45. The screw 15 screws the perforated plate 41 in place, in said groove, as best seen in Fig. 2.

On a shaft 48, supported crosswise of the machine, is a collar 49, from which an arm 50 extends. A set screw 51, holds the collar in position upon the shaft 48. A link bar 52 is pivotally mounted at its lower end on a stud 53 from the arm 50, and at its upper end passes loosely through a hole, made therefor in the plate 41. A lug 54 is mounted on the lower surface of the damper 43 and the upper end of the link bar 52 is pivotally connected to said lug. A wheel 55 is fastened on the shaft 48, and has a series of peripheral notches 56. A latch 57, pivotally mounted at 58, engages the wheel 55 in either of the notches 56 thereof.

A part of the upwardly-directed passageway to the dust cages (not shown) is represented at 59, and has the usual cut-off 60 hinged thereto at 61, and forming a part of the case or housing for the revoluble beater 1.

A fixed baffler plate 62 extends across the machine from side to side, and is supported by rings (one of which is shown in dotted lines), surrounding the shaft 9 loosely. A board or strip 63 also extends across the machine and has slots, indicated by dotted lines. The strip 63 is held to the baffler plate 62 by the bolts 64 tightened up by the nuts, as shown. By means of the slots in the strip 63, the upper end of the strip is held by the bolts 64 in snug contact with the under surface of the perforated plate 41. The screws 15 also serve to hold the baffler plate 62 from rocking on the shaft 9.

Through the side of the machine is a door 65. A swinging partition 66 extends across the machine, and has hinges 67 on its upper edge, at intervals. This partition 66 can be swung up, as shown in Fig. 2, to any desired height, to allow access to the interior of the machine for cleaning or repairs, but normally its lower edge rests on the floor 68, as shown in Fig. 1.

The movements of the grid bars 23 are limited in one direction by the fixed lug 44, and in the opposite direction by another fixed lug 69, projecting from each side plate 5.

The operation of my improved picking machine is as follows: The straight body portion of each grid bar 23 extends approximately in a radial direction with respect to the shaft 2 of the beater 1. This is the limit of the opening movement of the bars 23. The cotton, when subjected to the whipping action of the beater 1, is supported upon the sharp, upper edges of the bars 23, and the seeds, motes, grit, dirt and extraneous substances are dislodged and fall below the bars 23 to the floor, or into a suitable receptacle. When the grid bars 23 are in the open position, shown in Fig. 1, the notched plates or racks 16 are adjusted, as illustrated in Fig. 1. At that time, the arm 24 is in its lowest position, and the spring latch 31 is in engagement with the lowest notch of the piece 29. While in this open position, the upper or striking edges of all the grid bars 23 are in contact with the flanges 10 of the side pieces 5. The straight body portion of each grid bar 23 rests against and bears upon the left-hand upper corner of the fixed lug 22, next adjacent to it on the right (as seen in the drawings), as a fulcrum, because of the blows of the beater arms 1 upon the cotton, which is passing over the upper edges of said grid bar, the direction of such movement being caused by the direction of the rotation of the shaft, as indicated by the arrow $a$. The straight body portion of each grid bar 23 then rests solidly against the radially-directed right-hand edge of the fixed lug 22, next adjacent to it on the left (as seen in the drawings). The lower portion of said body of the grid bar 23 also presses against that tooth of each notched plate or rack 16, which is adjacent to it on the right. The grid bars 23 are spaced farther apart at the left-hand end of the side pieces 5 (as seen in the drawings) on account of the greater width there of the fixed lugs 22 and of the rack teeth 17, thus providing larger apertures for the passage of the undesirable substances beaten from the cotton, as soon as dislodged from the feed rolls 3 and 4; but these apertures diminish in capacity toward the right, because as the cotton advances and is cleared of said refuse substances, the coarser parts are first removed, and then those which are less coarse.

The open position of the grid bars 23, shown in Fig. 1, is that which is preferred for use in the scutching of long-stapled cotton. The upper or whipping edges of the grid bars 23 are then at the nearest possible approach to the beater 1, and here the blows are somewhat lighter, as the relative quantity of the refuse matter is proportionately smaller, and the cotton, being thus struck in the comparatively narrow space, is partially rolled by the blows of the beater and forms a cotton film of superior quality.

When the grid bars 23 are to be set in the close position illustrated in Fig. 2, the arm 24 is moved from the position shown in Fig. 1, and the spring latch 31 is properly manipulated for that purpose, and is engaged with the highest notch in the piece 29. This movement of the arm 24 rocks the shaft 9 in its bearings, and by the link bar 26 slides the notched plate or rack 16 in a direction away from the feed roll 4, the block 20 moving in and along the slot 19 in the lower flange 13 of each side piece 5. The grid bars 23 are then in their nearest approach to each other. Each grid bar 23 then rests in abutment on the right-hand upper corner of that fixed lug 22, which is next adjacent thereto on the left (as seen in the drawings), and at the same time on the left-hand upper corner of that fixed lug 22, which is next adjacent to said grid bar 23 on the right. The lower rounded edge of each grid bar 23 is at that time seated in the corresponding spaces or recesses between the two adjacent teeth of the notched plates or racks 16, and is in abutment with the beveled edge of the tooth next adjacent on the left. In this position the bent upper end of the grid bars 23 lie close to each other and reduce the width of the apertures between said bars. It is seen that the upper ends of the grid bars 23 are then somewhat below the flange 10 of the side pieces 5. This position is that preferably used for short-stapled cotton and allows a more thorough cleaning. It is thus seen that all the grid bars 23 are moved to precisely the same extent and to the same angular position simultaneously, by the one movement of the notched plates or racks 16 on the side plates 5, and it is obvious that any desired adjustment and clearance can be obtained at any intermediate position or degree, between the positions shown in Figs. 1 and 2, as well as in said extreme positions. But in whatever position these grid bars 23 may be set, the distances between the upper sharp edges of them all are equal; and in every position of said bars, their said edges are always at the same acute angle to the path of the beater 1.

By this construction, all pivotal bearings on the ends of the grid bars, as have been heretofore usual, are entirely dispensed with, and an oscillating movement of every grid bar 23 is provided from the extreme lower edge thereof, where it is seated in a socket or space between two contiguous teeth of each notched plate or rack 16. Each grid bar 23 is separately detachable, and there is exactly a sufficient space between the upper right-hand corner of one fixed lug 22 and the upper left-hand corner of the next adjacent fixed lug 22 to the right (as seen on the drawings) to allow the grid bar 23 to enter and slide in said space to its seat in the notched plate or rack 16, said two lugs 22 serving as guides for that purpose. To allow the insertion or removal of the grid bars 23, or any of them, the flanges 10 must be detached from the side plates 5, by taking out the screws 11 and 12.

The bottom edges of the fixed lugs 22 are all in one line parallel to the upper edge of the side plate 5, but on account of the angles at the upper end of each of said lugs, as already described, it results that the left-hand upper corner of each of said lugs is nearer to the upper edge of the side plate 5 than the right-hand upper corner of said lug is. The grid bar 23, in moving from either of the positions shown to the other, or to any intermediate position, always rests on its rounded bottom in its own tooth-space of each notched plate or rack 16, but it necessarily has a sliding movement along the fixed lugs 22, with which it is in abutment. The abutting upper corners of every two of said lugs are consequently at a slightly different distance from the upper edge of the side plate 5, so that the grid bar 23 can fulcrum on either of said corners as the direction of movement requires.

The air currents, usual in cotton picker machines, for the two purposes of cleaning the cotton from the upper edges of the grid bars to facilitate its progress therefrom to the edges under the operation of the beater, and for creating the necessary suction to hold the cotton to the cages prior to its delivery therefrom, are caused in my improved machine by a fan, as usual, (not shown), but I provide means for dividing the air currents proportionately. So much of the air current as enters the door 65 above the upper surface of the swinging partition 66, passes through the grid bars 23 for the purpose already explained; but so much of the air current as enters the door 65 below the lower surface of said partition 66 passes to the cages.

The partition 66, while the machine is in operation, extends across the doorway 65, through which the air enters the machine by the suction of the fan. If the damper 43 is closed, as represented in Fig. 1, the whole air current passes out through the grid, between the bars 23; but if the damper 43 is raised, as is seen in Fig. 2, to its full extent, or to any intermediate degree, a portion of the air current passes up through the grid, out between the bars 23, and another portion passes through the apertures 42 of the perforated plate 41, and then both air currents unite and pass to the cages and through them inwardly, as usual.

The wheel 55 is capable of a rotary movement on its shaft 49 to an extent illustrated by the drawings, from the position shown in Fig. 1 to the position shown in Fig. 2, when the wheel 55 is in the position shown in Fig. 1, the damper 43 is closed, being in contact with the perforated plate 41, and so prevents air from passing through the perforations 42 of said plate. When the wheel 55 is in the position shown in Fig. 2, the damper 43 is open to its fullest extent, and the air passes up through the perforations 42 into the passageway to the cages. In whatever position the wheel 55 is set, it is held by the latch 57, engaging the adjacent notch 56 of said wheel. Thus, without changing the fan or interfering in any way with its rate of rotation, the exact volume and force of air current desired for the first grid can be regulated and maintained, while the air current through the cages continues undiminished. The cotton, in passing from the first grid to the second, moves along the upper surface of the damper 43.

I claim as a novel and useful invention and desire to secure by Letters Patent:—

1. The improved grid for cotton picker machines herein described, consisting of the combination of two curved side plates; a laterally extending detachable flange on the upper edge of each side plate; a laterally extending flange on the lower edge of each side plate; a plurality of lugs in series upon each side plate, which at their upper contiguous corners are equi-spaced apart, each lug having its rear edge directed radially with respect to the curvature of that side plate to which it is fixed and its forward edge at an acute angle to its said rear edge; two curved plates mounted slidably on the lower flange of each side plate and provided with teeth, whose forward edge is directed radially with respect to the curvature of the curved plate to which it belongs and whose rear edge is at an acute angle to its said forward edge; a series of grid bars mounted at their bottom edges between teeth of said two notched plates, respectively, each of which bars has a straight body portion and an upper bent end, terminating in a short upper edge, the body portion of each bar being of a thickness nearly equal to the said space between each two contiguous lugs, so as to be capable of a sliding movement loosely between said lugs, but in contact with each, and the bottom edge of each bar being rounded and seated in the recess between two corresponding contiguous teeth of said notched plate, which recess is approximately equal in width to the thickness of the body portion of said bar; and means for giving a longitudinal movement and adjustment to said notched plates upon said side plates, respectively.

2. The improved grid for cotton picker machines herein described, consisting of the combination of two curved side plates, each having flanges upon its upper and lower edges; a plurality of fixed lugs in series upon each side plate, each lug having two fulcrum edges on its upper surface on opposite sides thereof, respectively, one fulcrum edge being nearer the upper edge of the side plate than the other is; a curved plate mounted slidably upon the lower flange of each side plate and having teeth, each of which teeth is beveled on one side thereof; a series of grid bars, each of uniform thickness, and approximately equal to the width of the recess between the contiguous teeth of the notched plate, and each bar having a bent upper end, terminating in a sharp edge, and a rounded bottom edge seated in two corresponding tooth recesses of the notched plates; and means for longitudinally moving and adjusting each notched plate, each of said bars being adapted to slide between said fixed lugs as guides and to fulcrum on the upper corners thereof, respectively, according to the direction of movement of said notched plates.

3. The improved grid for cotton picker machines herein described, consisting of the combination of two curved side plates; a series of fixed lugs on each side plate and having equal spaces between each upper corner thereof and the corner of the next contiguous lug; two plates mounted slidably on the side plates and each provided with a series of teeth with equal intervening spaces; and a plurality of grid bars, seated in said tooth-spaces, respectively, and having a thickness equal to the width of said tooth-spaces at the bottom thereof and to said lug spaces at the top thereof and arranged to have a constant bearing and contact upon both their forward and rear sides upon said corners of said adjacent lugs, respectively, and adapted to change their angular direction proportionately with the movement of the notched plates.

4. The improved grid for cotton picker machines herein described, consisting of the combination of two curved side plates; a series of fixed lugs on each side plate and having equal spaces between each upper corner thereof and the corner of the next contiguous lug; two plates mounted slidably on the side plates and each provided with a series of teeth with equal intervening spaces; a plurality of grid bars, seated in said tooth-spaces, respectively, and having a thickness equal to the width of said tooth-spaces at the bottom thereof and to said lug spaces at the top thereof and arranged to have a constant bearing and contact upon both their forward and rear sides upon said corners of said adjacent lugs, respectively, and adapted to change their angular direction proportionately with the movements of the notched plates; and an integral head upon the upper end of each grid bar, provided with a sharp whipping edge, all so arranged and combined that said whipping edges are always equally distant from each other, whatever may be the angular direction of said bars, caused by the movements of said notched plates.

5. The improved grid for cotton picker machines herein described, consisting of the combination of two curved side plates; a series of fixed lugs spaced equally apart on each side plate; a plate mounted slidably on each side plate and each provided with teeth spaced equally apart; a plurality of grid bars mounted on their bottom edges in said tooth-spaces of the second named plates, respectively, and each in contact with said lugs, respectively, on both their contiguous front and rear sides; and an integral head on the upper end of each bar, provided with an acute-angled whipping edge, all said whipping edges being disposed in one curve symmetrically and concentrically with the curved edges of both of said side plates, whatever may be the angular direction of said bars, caused by the movements of said notched plates.

6. In a cotton picker machine, the combination of a revoluble beater; a plurality of grid bars in proximity to said beater and concentric therewith; a case or housing for said beater; a passage-way from said case; a second longitudinally extending series of grid bars; a perforated plate extending from the first named series of grid bars to the second named series of grid bars; a damper hinged at one end to said perforated plate and adapted normally to rest upon the perforated plate in contact therewith throughout the entire extent of the latter; means of elevating said damper at will; an air chamber; a door admitting air into said chamber under pressure; and a partition directing the air currents up through the first named grid bars continuously, and at will directing a portion of said air-currents through the perforated plate into said passage-way, when the damper is open.

7. In a cotton picker machine having two grids and an intervening space adapted for a passage-way for air, the combination therewith of a perforated plate across said passage-way; and a damper hinged to said plate, and adapted to be moved into contact with the entire extent of said perforated plate or out of such contact for the purpose of closing or opening at will said perforated plate for preventing or allowing air-currents therethrough.

8. In a cotton picker machine having two grids and an intervening air passage between the grids, the combination therewith of a perforated plate extending across said passage; a damper hinged to the plate and adapted to move into contact with said plate throughout the entire extent of the latter and out of said contact at will; a shaft mounted in the frame of the machine; a lever arm fastened on the shaft; and a link bar passing loosely through an opening in said plate and pivotally connected at one end with the damper and at the opposite end with the lever arm.

9. In a cotton picker machine having two grids and an intervening air passage, the combination therewith of a perforated plate extending across said passage; a damper hinged to the plate and adapted to move into contact with said plate throughout the entire extent of the latter and out of said contact at will; a shaft mounted in the frame of the machine; a lever arm fastened on the shaft; a link bar pivoted at one end to the damper and at the opposite end to the lever arm and passing loosely through an opening in the plate; a wheel fastened on the shaft and having on its periphery a series of radial notches; and a latch adapted to engage the wheel in either of said notches at will.

10. In a cotton picker machine, the combination of two grids; an air inlet; and a movable partition adapted to divide one air-current into two air currents proportionately and to direct one of said two air-currents through the first grid from the bottom thereof upwardly and to direct the other of said two air-currents over and along the upper surface of the second grid.

11. In a cotton picker machine the combination of two grids; an air inlet; and a partition extending angularly across the air inlet and movable to variable extents at will to divide the air-current proportionately for the purpose specified.

In testimony whereof I affix my signature in presence of two witnesses.

AMASA ST. ONGE.

Witnesses:
 WARREN R. PERCE,
 ANNIE E. PERCE.